United States Patent
Bonrath et al.

(10) Patent No.: US 12,479,814 B2
(45) Date of Patent: *Nov. 25, 2025

(54) PROCESS FOR PRODUCTION OF NEW SULFOLENIC INTERMEDIATES

(71) Applicant: DSM IP ASSETS B.V., Heerlen (NL)

(72) Inventors: Werner Bonrath, Kaiseraugst (CH); Marc-André Mueller, Kaiseraugst (CH); Bettina Wuestenberg, Kaiseraugst (CH); Viktor Zimmermann, Kaiseraugst (CH)

(73) Assignee: DSM IP ASSETS B.V., Maastricht (NL)

( * ) Notice: Subject to any disclaimer, the term of this patent is extended or adjusted under 35 U.S.C. 154(b) by 596 days.

This patent is subject to a terminal disclaimer.

(21) Appl. No.: 17/915,448

(22) PCT Filed: Mar. 22, 2021

(86) PCT No.: PCT/EP2021/057242
§ 371 (c)(1),
(2) Date: Sep. 28, 2022

(87) PCT Pub. No.: WO2021/197889
PCT Pub. Date: Oct. 7, 2021

(65) Prior Publication Data
US 2023/0142429 A1    May 11, 2023

(30) Foreign Application Priority Data
Mar. 31, 2020 (EP) .................................... 20167023

(51) Int. Cl.
*C07D 333/48* (2006.01)

(52) U.S. Cl.
CPC .................................. *C07D 333/48* (2013.01)

(58) Field of Classification Search
CPC ..................................................... C07D 333/48
See application file for complete search history.

(56) References Cited

PUBLICATIONS

International Search Report and Written Opinion of the ISA for PCT/EP2021/057242, mailed May 19, 2021, 13 pages.
Subramanian et al., "Short Synthetic Route to Retinoids Through Dialkylation of 3-Methyl-3-Sulfolene", Tetrahedron Letters, Elsevier Ltd, vol. 38, No. 14. Apr. 7, 1997, pp. 2585-2586.
T. Subramanian et al., "Convenient Synthesis of 1,3,6-Triene Systems Through Alkylation of 3-Methyl-3-sulfolene", Synthetic Communications, vol. 27, No. 23, Dec. 22, 1997, pp. 4067-4072.
Subramanian et al., "Conveni Ent Synthesis of Retinol-Related Polyenes Through Hydroxy Alkylation of 3-Sulfolenes", Synthetic Communications, vol. 31, No. 18, Jan. 1, 2001, pp. 2787-2793.
The First Office Action, CN Application No. 202180024838.2, Sep. 19, 2023.
Desai, S.R. et al, Studies in Alkylation of 3-Methyl-3-Sulfolene and Thermolysis of Resulting 2-Alkyl-3-Sulfolenes: Convenient Synthesis of 1,2-Disubstituted-1,3-Dienes, *Tetrahedron* vol. 48, No. 3, pp. 481-490, 1992.

*Primary Examiner* — Rebecca L Anderson
(74) *Attorney, Agent, or Firm* — NIXON & VANDERHYE P.C.

(57) ABSTRACT

The present invention relates to a new process for the production of new specific intermediates, which are preferably used in the production of vitamin A, vitamin A acetate, or β-carotene and derivatives thereof, e.g. canthaxanthin, astaxanthin or zeaxanthin.

13 Claims, No Drawings

PROCESS FOR PRODUCTION OF NEW SULFOLENIC INTERMEDIATES

This application is the U.S. national phase of International Application No. PCT/EP2021/057242 filed Mar. 22, 2021, which designated the U.S. and claims priority to EP patent application No. 20167023.9 filed Mar. 31, 2020.

The present invention relates to a new process for the production of new specific intermediates, which are preferably used in the production of vitamin A, vitamin A acetate, or β-carotene and derivatives thereof, e.g. canthaxanthin, astaxanthin or zeaxanthin. Especially to be mentioned is that the new compounds are useful as intermediates (building blocks) in the synthesis of vitamin A or β-carotene, preferably vitamin A.

Vitamin A or its derivatives such as Vitamin acetate

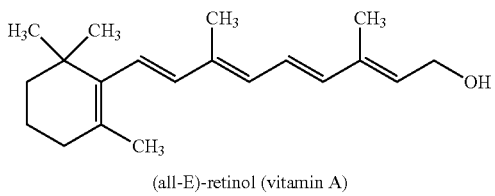 [SMILES: CC1=C(/C=C/C(C)=C/C=C/C(C)=C/CO)C(C)(C)CCC1]

(all-E)-retinol (vitamin A)

is an important ingredient for many applications. Vitamin A plays a role in a variety of functions throughout the body, such as e.g. vision process, gene transcription, immune function, bone metabolism, haematopoiesis, skin and cellular health and antioxidant function.

Due to the importance of vitamin A (and its derivatives) and the complexity of the synthesis thereof, there is always a need for improved processes of production.

The goal of the present invention was to find easily accessible compounds, which can then be used in an improved synthesis of vitamin A or its derivates, or β-carotene, preferably vitamin A (acetate). The aim was achieved by the synthesis as disclosed and described below.

The new intermediates, which are produced by the process according to the present invention are the compounds of formula (I)

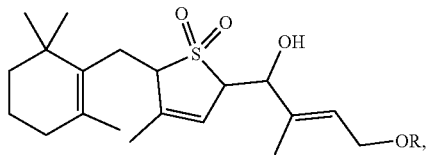

(I)

wherein
R is H, or —(CO)—(CH$_2$)$_n$CH$_3$, wherein n has a value of 0-14, or
R is —X(C$_{1-4}$alkyl)$_3$ or —X(C$_6$H$_5$)$_3$, wherein X is Si or Ge
or R is tetrahydro pyrane, isopropylmethyl ether or 2-methoxy-butylether,
which are ideal intermediates (especially) in the vitamin A (and/or its derivates) production.

How vitamin A (and/or its derivatives) are obtained is disclosed and discussed further below.

The compounds of formula (I), (II) and (III) have several diastereoisomeric forms. Also when not explicitly disclosed all of these forms are all claimed and disclosed by the Markush formulae of these compounds in the present patent application.

To obtain a compound of formula (I), the compound of formula (II)

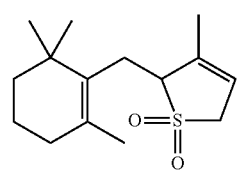

(II)

is reacted with a compound of formula (III)

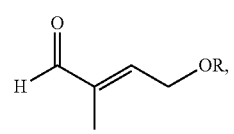

(III)

wherein
wherein R is H, or —(CO)—(CH$_2$)$_n$CH$_3$, wherein n has a value of 0-14, or
R is —X(C$_{1-4}$alkyl)$_3$ or —X(C$_6$H$_5$)$_3$, wherein X is Si or Ge
or R is tetrahydro pyrane, isopropylmethyl ether or 2-methoxy-butylether.

Therefore the present invention relates to a process (P) for the production of a compound of formula (I)

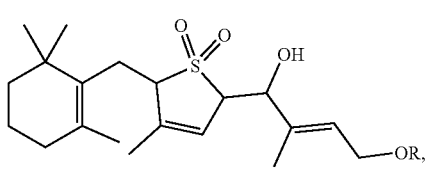

(I)

wherein
R is H, or —(CO)—(CH$_2$)$_n$CH$_3$, wherein n has a value of 0-14, preferably 0-10, more preferably 0 or 1, most preferably 1, or
R is —X(C$_{1-4}$alkyl)$_3$ or —X(C$_6$H$_5$)$_3$, wherein X is Si or Ge,
or
R is tetrahydro pyrane, isopropylmethyl ether or 2-methoxy-butylether,
characterized in that the compound of formula (II)

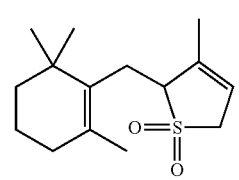

(II)

is reacted with a compound of formula (III)

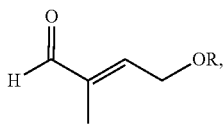

(III)

wherein R has the same meanings as defined for the compound of formula (I).

Therefore the present invention also relates to a process (P') for the production of a compound of formula (I)

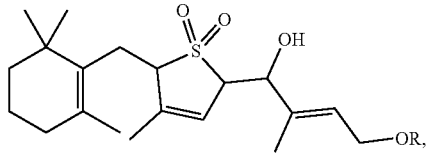

(I)

wherein

R is H, or —(CO)—(CH$_2$)$_n$CH$_3$, wherein n has a value of 0-10.

Therefore the present invention also relates to a process (P'') for the production of a compound of formula (I)

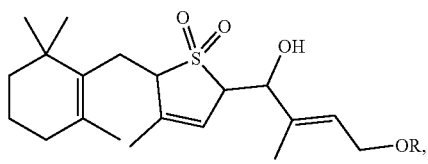

(I)

wherein

R is H, or —(CO)—(CH$_2$)$_n$CH$_3$, wherein n has a value of 0 or 1.

Therefore the present invention also relates to a process (P''') for the production of a compound of formula (I)

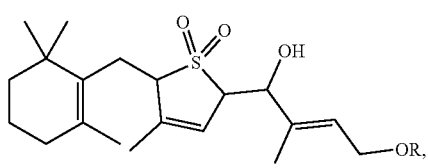

(I)

wherein

R is H, or —(CO)—(CH$_2$)CH$_3$.

Therefore the present invention also relates to a process (P'''') for the production of a compound of formula (I)

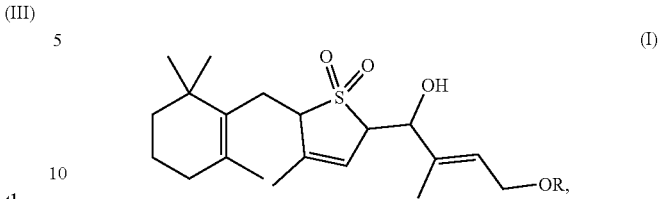

(I)

wherein

R is —X(C$_{1-4}$alkyl)$_3$ or —X(C$_6$H$_5$)$_3$, wherein X is Si or Ge.

Therefore the present invention also relates to a process (P''''') for the production of a compound of formula (I)

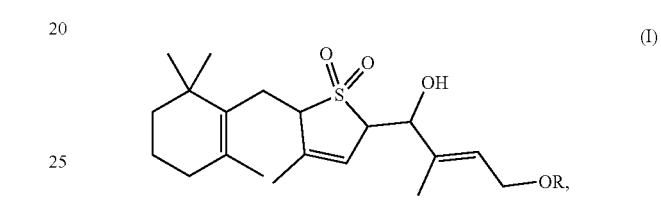

(I)

wherein

R is tetrahydro pyrane, isopropylmethyl ether or 2-methoxy-butylether.

It is known from the prior art how to obtain the compounds of formula (II) (e.g. from Desai et al. Tetrahedron, 1992, 48, 481-490 or from Kienzle et al. Helvetica Chimica Acta, 1975, 58, 27-40.)

The process according to the present invention is usually carried out in the presence of a strong base such as Schlesinger base, 2,2,6,6-tetramethyl piperidine, lithium diisopropylamide, n-butyllithium, hexyllithium, tert-butyl lithium, sec-butyllithium, metal amide (with metals such as Na, K and Cs), lithium hexamethyldisilazane, metal hydride (with metals such as Na, Mg, K and Cs), metal hydroxide (with metals such as Na, K and Cs), metal alkoxide (with metals such Na, K and Cs) or sodium hexamethyl-disilazane.

Therefore the present invention relates to the process (P1), which is process (P), (P'), (P''), (P'''), (P'''') or (P'''''), wherein the process is carried out in the presence of at least one strong base.

Therefore the present invention relates to the process (P1'), which is process (P1), wherein the at least one strong base is chosen from the group consisting of Schlesinger base, 2,2,6,6-tetramethyl piperidine, lithium diisopropylamide, n-butyllithium, hexyllithium, tert-butyl lithium, sec-butyllithium, metal amide (wherein the metals are chosen from the group consisting of Na, K and Cs), lithium hexamethyldisilazane, metal hydride (wherein the metals are chosen from the group consisting of Na, Mg, K and Cs), metal hydroxide (wherein the metals are chosen from the group consisting of Na, K and Cs), metal alkoxide (wherein the metals are chosen from the group consisting of Na, K and Cs) and sodium hexamethyl-disilazane.

The process is usually carried out in an inert solvent. Preferably the solvent is a polar aprotic solvent. More preferably the solvent is chosen from the group consisting of pyridine, toluene, xylene, tetrahydrofuran (THF), methyl THF, or ethers (such as diethylether, 1,4-dioxane, 1,2-dimethoxyethane and crown ethers).

It is also possible to have a mixture of solvents, wherein one solvent can also be a nonpolar solvent (such as heptane, n-pentane, and other hydrocarbones).

Therefore the present invention relates to the process (P2), which is process (P), (P'), (P''), (P'''), (P''''), (P'''''), (P1) or (P1'), wherein the process is carried out in at least one inert solvent.

Therefore the present invention relates to the process (P2'), which is process (P2), wherein the solvent is a polar aprotic solvent.

Therefore the present invention relates to the process (P2''), which is process (P2) or (P4'), wherein the at least one solvent is chosen from the group consisting of pyridine, toluene, xylene, THF, methyl THF, and ethers.

Therefore the present invention relates to the process (P2'''), which is process (P2) or (P4'), wherein the at least one solvent is chosen from the group consisting of pyridine, toluene, xylene, THF, methyl THF, and ethers chosen from the group consisting of diethylether, 1,4-dioxane, 1,2-dimethoxyethane and crown ethers.

The process according to the present invention is usually carried out at low temperature. Usually a temperature range of from −100° C. to 25° C., preferably at a temperature range of from −95° C. to 5° C.

Therefore the present invention relates to the process (P3), which is process (P), (P'), (P''), (P'''), (P''''), (P'''''), (P1), (P1'), (P2), (P2'), (P2'') or (P2'''), wherein the process is carried out at a temperature range of from −100° C. to 25° C.

Therefore the present invention relates to the process (P3'), which is process (P), (P'), (P''), (P'''), (P''''), (P'''''), (P1), (P1'), (P2), (P2'), (P2'') or (P2'''), wherein the process is carried out at a temperature range of from −95° C. to 5° C.

The starting material, which are the compounds of formula (II) and of formula (III) can be used in equimolar amounts. But it is also possible to use an excess of one of the starting material. Usually the molar ratio of the compound of formula (II) to the compound of formula (III) goes from 1:2 to 2:1.

Therefore the present invention relates to the process (P4), which is process (P), (P), (P'), (P''), (P'''), (P''''), (P'''''), (P1), (P1'), (P2), (P2'), (P2''), (P2'''), (P3) or (P3'), wherein the molar ratio of the compound of formula (II) to the compound of formula (III) goes from 1:2 to 2:1.

The obtained products of the process according to the present invention (these are the compound of formula (I)) are new ideal intermediates. Especially in the production of vitamin A and its derivates.

Therefore the present invention relates to compounds of formula (I)

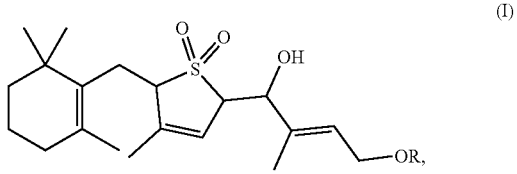

wherein

R is H, or —(CO)—(CH$_2$)$_n$CH$_3$, wherein n has a value of 0-14, or

R is —X(C$_{1-4}$alkyl)$_3$ or —X(C$_6$H$_5$)$_3$, wherein X is Si or Ge, or

R is tetrahydro pyrane, isopropylmethyl ether or 2-methoxy-butylether.

Preferably, the present invention relates to compounds of formula (I)

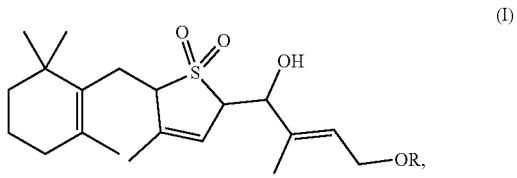

wherein R is —(CO)—(CH$_2$)$_n$CH$_3$, wherein n has a value of 0-10.

More preferably, the present invention relates to compounds of formula (I)

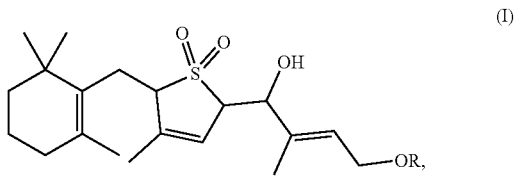

wherein R is —(CO)—(CH$_2$)$_n$CH$_3$, wherein n has a value of 0 or 1.

Most preferably, the present invention relates to the compound of formula (I)

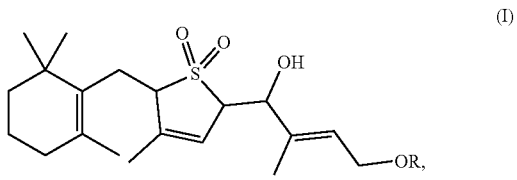

wherein R is —(CO)—(CH$_2$)CH$_3$.

The following schema shows how to produce vitamin A (or derivatives thereof) can be obtained.

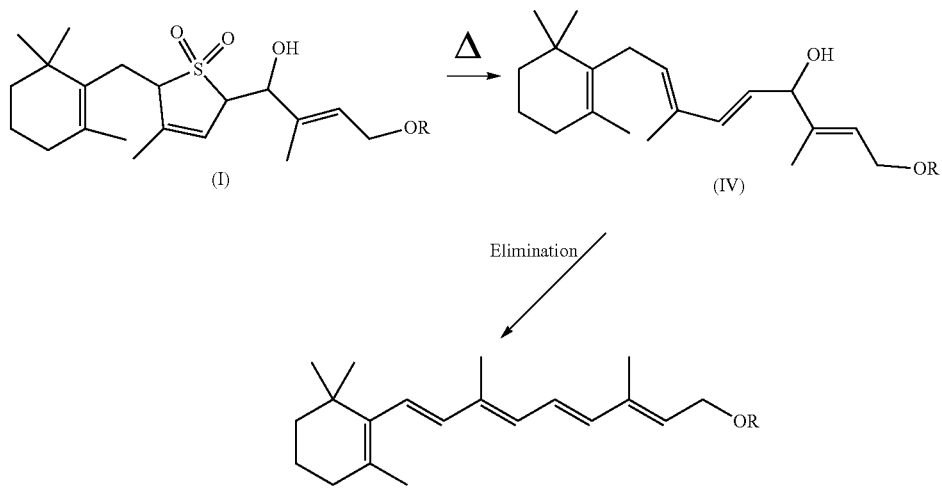

R has the same meanings are defined above.

The following example serve to illustrate the invention. The temperature is given in ° C. and all percentages are related to the weight.

EXAMPLES

Example 1: Synthesis of the Intermediate

3-Methyl-2-((2,6,6-trimethylcyclohex-1-en-1-yl)methyl)-2,5-dihydrothiophene 1,1-dioxide (5.65 g, 20.1 mmol; 1.0 eq), (E)-3-methyl-4-oxobut-2-en-1-yl acetate (2.95 g, 20.8 mmol; 1.03 eq) and dry tetrahydrofuran (40.0 mL) were placed in a dried four necked round bottom flask equipped with a magnetic stirrer, thermometer and condenser under an argon atmosphere. The reaction mixture was cooled to −76° C. Lithium diisopropylamide (20.0 mL, 20.0 mmol, 0.99 eq, 1 M in tetrahydrofuran/hexane, d=0.719 g/mL) was added dropwise over a period of 40 min. The reaction was stirred at −76° C. for 2 h. Subsequently, the cooling bath was removed and half saturated ammonium chloride solution (100 mL) was added. The reaction mixture was diluted with diethylether (150 mL). The aqueous layer was separated and extracted with diethylether (150 mL). The organic layers were washed with half saturated ammonium chloride solution (100 mL), water (2×100 mL) and saturated sodium chloride solution (100 mL). The combined organic layers were filtered over a plug of cotton wool. All volatiles were evaporated at 40° C. (5 mbar).

The crude was purified with a column chromatography (SiO2) to obtain the products in 45% yield.

Example 2: Synthesis of Compound IV (E)-4-hydroxy-3-methyl-4-(4-methyl-1,1-dioxido-5-((2,6,6-trimethylcyclohex-1-en-1-yl)methyl)-2,5-dihydrothiophen-2-yl)but-2-en-1-yl acetate (55 mg, 0.13 mmol; 1.0 eq) and pyridine (3.0 mL) were placed in a dried two necked round bottom flask equipped with a magnetic stirrer and condenser under an argon atmosphere. The reaction mixture was heated to 100° C. for 5 h. All volatiles were evaporated under reduced pressure (50° C., 5 mbar) to obtain the product in 82% yield

Example 3: Synthesis of Vitamin A Acetate from Compound I (E)-4-hydroxy-3-methyl-4-(4-methyl-1,1-dioxido-5-((2,6,6-trimethylcyclohex-1-en-1-yl)methyl)-2,5-dihydrothiophen-2-yl)but-2-en-1-yl acetate (product obtained from Example 1) (263 mg, 0.6 mmol; 1.0 eq) and dry toluene (5.0 mL) were placed in a dried two necked round bottom flask equipped with a magnetic stirrer and condenser under an argon atmosphere. The reaction mixture was heated to reflux for 2 h. All volatiles were evaporated under reduced pressure (40° C., 5 mbar) to obtain the product in a yield of 71%.

Example 4: Preparation of Retinyl Propionate

3-Methyl-2-((2,6,6-trimethylcyclohex-1-en-1-yl)methyl)-2,5-dihydrothiophene 1,1-dioxide (310 mg, 1.1 mmol; 1.0 eq), (E)-3-methyl-4-oxobut-2-en-1-yl propionate (190 mg, 1.2 mmol; 1.1 eq) and dry toluene (2.0 mL) were placed in a dried two necked round bottom flask under an argon atmosphere. The reaction mixture was cooled to −76° C. Lithium diidopropylamide (1.2 mL, 1.2 mmol, 1.1 eq, 1 M in tetrahydrofuran/hexane, d=0.719 g/mL) was added over a period of 7 min. The reaction mixture was stirred at −76° C. for 7 min. Subsequently the cooling bath was removed and half saturated ammonium chloride solution (5 mL) was added. The reaction mixture was diluted and extracted with toluene (10 mL). The aqueous layer was separated and extracted with toluene (10 mL). The organic layers were washed with water (2×10 mL) and saturated sodium chloride solution (1×10 mL). The combined organic layers were filtered over a plug of cotton wool. All volatiles were evaporated at 40° C. (5 mbar) until a clear yellow oil remained.

The oil was placed in a dried two necked round bottom flask and dissolved in toluene (5 mL) with a magnetic stirrer, condenser under an argon atmosphere. The reaction mixture was heated to reflux for 2 h. All volatiles were evaporated under reduced pressure (50° C., 5 mbar) to obtain the product (399 mg), yield=52%.

Example 5: Preparation of Retinyl Acetate

3-Methyl-2-((2,6,6-trimethylcyclohex-1-en-1-yl)methyl)-2,5-dihydrothiophene 1,1-dioxide (308 mg, 1.1 mmol; 1.0 eq), (E)-3-methyl-4-oxobut-2-en-1-yl acetate (161 mg, 1.1 mmol; 1.0 eq) and dry toluene (2.0 mL) were placed in a dried two necked round bottom flask equipped with a magnetic stirrer under an argon atmosphere. The reaction mixture was cooled to −76° C. Lithium diidopropylamide (1.2 mL, 1.2 mmol, 1.1 eq, 1 M in tetrahydrofuran/hexane, d=0.719 g/mL) was added dropwise over a period of 8 min. The reaction was stirred at −76° C. for 7 min. Subsequently, the cooling bath was removed and half saturated ammonium chloride solution (5 mL) was added. The reaction mixture was diluted with toluene (10 mL). The aqueous layer was separated and extracted with toluene (10 mL). The organic layers were washed with water (2×10 mL) and saturated sodium chloride solution (1×10 mL). The combined organic layers were filtered over a plug of cotton wool. All volatiles were evaporated at 40° C. (5 mbar).

The oil was placed in a dried two necked round bottom flask and dissolved in toluene (5 mL) with a magnetic stirrer under an argon atmosphere. The reaction mixture was heated to reflux for 1 h. All volatiles were evaporated under reduced pressure (40° C., 5 mbar). Purification afforded the product in 34% yield.

The invention claimed is:

1. A process of the production of compounds of formula (I):

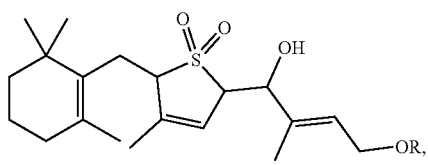

(I)

wherein
R is H or —(CO)—(CH$_2$)$_n$CH$_3$, wherein n has a value of 0-14, or
R is —X(C$_{1-4}$alkyl)$_3$ or —X(C$_6$H$_5$)$_3$, wherein X is Si or Ge, or
R is tetrahydro pyrane, isopropylmethyl ether or 2-methoxy-butylether, wherein
the process comprises reacting a compound of formula (II):

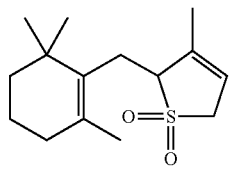

(II)

with a compound of formula (III):

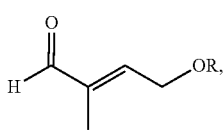

(III)

to obtain the compound of formula (I), wherein
R in formula (III) has the same meanings as in formula (I).

2. The process according to claim 1, wherein
R is H or —(CO)—(CH$_2$)$_n$CH$_3$, wherein n has a value of 0 or 1, or
R is —X(C$_{1-4}$alkyl)$_3$ or —X(C$_6$H$_5$)$_3$, wherein X is Si or Ge, or
R is tetrahydro pyrane, isopropylmethyl ether or 2-methoxy-butylether.

3. The process according to claim 1, wherein the process is carried out in the presence of at least one strong base.

4. The process according to claim 3, wherein the at least one strong base is selected from the group consisting of a Schlesinger base, 2,2,6,6-tetramethyl piperidine, lithium diisopropylamide, n-butyllithium, hexyllithium, tert-butyl lithium, sec-butyllithium, metal amide, lithium hexamethyldisilazane, metal hydride, metal hydroxide, metal alkoxide and sodium hexamethyl-disilazane.

5. The process according to claim 1, wherein the process is carried out in at least one inert solvent.

6. The process according to claim 5, wherein the solvent is a polar aprotic solvent.

7. The process according to claim 5, wherein the at least one solvent is selected from the group consisting of pyridine, toluene, xylene, tetrahydrofuran (THF), methyl THF and ethers.

8. The process according to claim 1, wherein the process is carried out at a temperature in a range of −100° C. to 25° C.

9. The process according to claim 1, wherein the reaction of the compounds of formulas (II) and (III) is conducted in a molar ratio of the compound of formula (II) to the compound of formula (III) of 1:2 to 2:1.

10. The process according to claim 7, wherein the at least one solvent is an ether selected from the group consisting of diethylether, 1,4-dioxane, 1,2-dimethoxyethane and crown ethers.

11. A compound of formula (I):

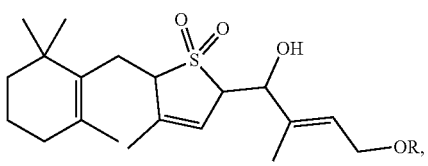

(I)

wherein
R is H or —(CO)—(CH$_2$)$_n$CH$_3$, wherein n has a value of 0-14, or
R is —X(C$_{1-4}$alkyl)$_3$ or —X(C$_6$H$_5$)$_3$, wherein X is Si or Ge, or
R is tetrahydro pyrane, isopropylmethyl ether or 2-methoxy-butylether.

12. The compound according to claim 11, wherein R is —(CO)—(CH$_2$)$_n$CH$_3$ and n has a value of 0-10.

13. The compound according to claim 11, wherein R is —(CO)—(CH$_2$)$_n$CH$_3$ and n has a value of 0 or 1.

* * * * *